United States Patent [19]

Greutert

[11] 4,255,265

[45] Mar. 10, 1981

[54] REUSABLE COFFEE FILTER

[75] Inventor: Albert Greutert, Sachseln, Switzerland

[73] Assignee: Maxs AG, Sachseln, Switzerland

[21] Appl. No.: 142,092

[22] Filed: Apr. 21, 1980

[30] Foreign Application Priority Data

Apr. 23, 1979 [DE] Fed. Rep. of Germany ....... 2916362

[51] Int. Cl.³ .............................................. B01D 25/04
[52] U.S. Cl. .................................... 210/474; 210/477; 210/497.3; 99/319
[58] Field of Search ............... 210/474, 481, 482, 479, 210/480, 471, 419, 464, 469, 477, 497; 99/279, 292, 304, 316, 317, 318, 319, 305, 306

[56] References Cited

U.S. PATENT DOCUMENTS

| 3,764,017 | 10/1973 | Dover | 210/481 |
| 3,943,058 | 3/1976 | Wurm | 210/482 |
| 4,110,221 | 8/1978 | Moser | 210/481 |

FOREIGN PATENT DOCUMENTS

| 2802240 | 7/1979 | Fed. Rep. of Germany | 210/481 |
| 269298 | 4/1927 | United Kingdom | 210/482 |

*Primary Examiner*—Benoît Castel
*Attorney, Agent, or Firm*—Frederick E. Bartholy

[57] ABSTRACT

This invention relates to a permanently useable coffee filter comprising a funnel-shaped container, of which the base is provided with at least one outlet opening, and a funnel-shaped filter insert which is inserted into the container and of which the filter surface is situated at a distance from the wall of the container.

14 Claims, 4 Drawing Figures

REUSABLE COFFEE FILTER

One known coffee filter of this type (German Utility Model No. 77 17 662) is attended by the disadvantage that the percolation rate depends to a large extent on how much coffee powder is poured into the filter insert and on whether the coffee powder is coarsely or finely ground. The result of this is that the coffee filter of this type can only be optimally used over a small area.

The object of the present invention is to develop a coffee filter of the type mentioned at the beginning in such a way that it has optimal properties over a wide region of the amount of water used and, in particular, enables the filtration rate to be adapted.

According to the invention, this object is achieved in that the filter insert carries an end piece at its end adjacent the outlet opening, in that the filter insert can be moved into several different positions relative to the container and in that the end piece and the adjacent region of the container are shaped in such a way that at least one flow passage is present between them, its flow resistance being dependent upon the position of the filter insert relative to the container.

One preferred embodiment is characterised in that the filter insert is displaceable along a helical path over the container. In this way, the flow resistance of the flow passage may be varied particularly easily.

In one particular embodiment, the filter insert is rotatable relative to the container. Alternatively, it may be displaceable axially of the container.

In one preferred embodiment, the end piece and the adjoining region of the container are provided with grooves which are shaped in such a way that, in a first position, they form a continuous flow path from the intermediate space between the filter surface of the filter insert and the container on the one hand to the space adjoining the outlet opening and, in positions differing from this first position, constrict the flow passage.

In every case, an additional position may be provided in which the end piece closes the outlet opening. This position may be used either to prepare tea instead of coffee or to close the coffee filter in order to prevent it from dripping.

In another embodiment, a seal is provided between the edge region of the open side of the filter insert and the container. This seal may assume the form of flat surfaces on the annular part and the container, a labyrinth seal or any other form, for example a lip seal or an O-ring seal.

In another embodiment, the filter surface of the filter insert is separated from the wall of the container by a distance of less than 1.5 mm. In this way the filtration rate is increased.

The annular part preferably has an end region which projects radially outwards beyond the container and which is for example U-shaped in cross-section and surrounds the top part of the container. This measure enables the filter insert to be easily gripped and adjusted.

One particular embodiment which is suitable for use in a coffee machine is characterised in that that region of the annular part which projects beyond the container has at least one cam surface which rests on a cam fixed to the coffee machine. In this way, when the coffee filter is removed from the coffee machine, the filter insert closes the outlet opening under the effect of its own weight, thereby preventing dripping. On the other hand, it is also possible in this way to ensure that, on introduction into the coffee machine, the filter insert is slightly raised so that the outlet opening is not closed, i.e. the boiling water cannot overflow.

Instead of being guided by a cam surface, the movement of the filter insert relative to the container may also be guided by a mortise-and-tenon joint, the mortise preferably being open at one end.

One embodimemt of the invention is described by way of example in the following with reference to the accompanying diagrammatic drawings, wherein.

Figure 1:
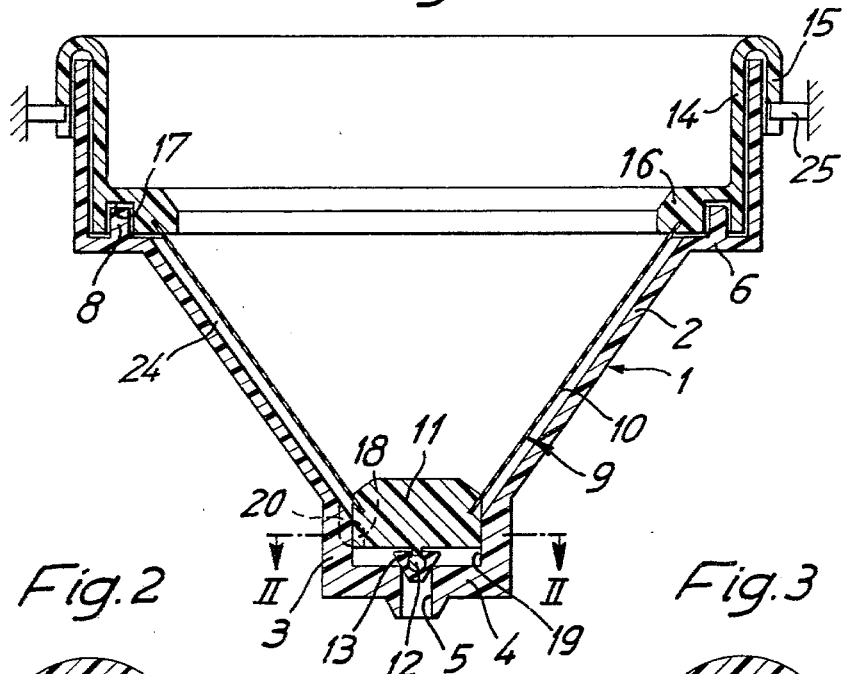
FIG. 1 is an axial section through a coffee filter.

The coffee filter shown in FIGS. 1 to 4 comprises a container 1 having a frustoconical region 2 adjoined at its narrow end by a base region 3 which is substantially cylindrical in shape and has a base 4 in which an outlet opening 5 is centrally provided. The larger-diameter end of the frustoconical region 2 merges into a shoulder 6 lying in a diameter plane and adjoined by a tubular region 7.

The shoulder 6 has an annular projection 8 which forms part of a labyrinth seal.

The filter insert 9 comprises a frustoconical filter surface 10 of a perforated metal plate of which the smaller front edge is embedded in a substantially cylindrical end piece 11 comprising a retaining pin 12 on its side facing towards the outlet opening 5. A conical seal 13 of a soft elastic material is fitted onto this retaining pin, cooperating with one edge of the outlet opening 5.

The larger, top edge of the filter surface 10 is embedded in an annular part 14 of which the end region 15 situated at a distance from the filter surface 10 is U-shaped in cross-section and accommodates the edge of the tubular region 7. The other end region of the annular part 14 forms a bead 16 in which the edge of the filter surface 10 is embedded and which comprises an annular groove 17 of which the dimensions are such that it is able to accommodate the annular projection 8 with some play.

Figure 2:
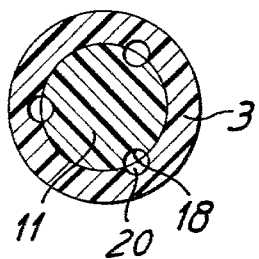
FIG. 2 is a sectional view along the line II—II of FIG. 1 in the position of least flow resistance.
Figure 3:
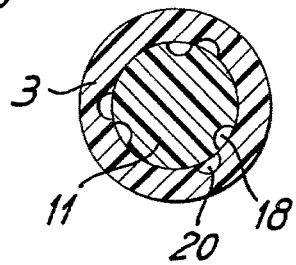
FIG. 3 is a view corresponding to FIG. 2 in the position of maximum flow resistance.

As can be seen from FIGS. 1 to 3, the end piece 11 is provided with three grooves 18 which are uniformly distributed around its periphery and which are open towards the outlet opening in the axial direction, but which at their other end do not project beyond the cylindrical surface region 19 of the pot-shaped base 3.

The base region 3 also contains three grooves 20 which are uniformly distributed around its periphery and which are open in the axial direction towards the intermediate space between the filter surface 10 and the container 1, but which at their other end do not project beyond the outer surface of the end piece 11.

In their respective positions shown in FIG. 2, the grooves 18 and 20 form a continuous flow passage through which the filtrate is able to flow. If the filter insert 9 is rotated relative to the container 1, this flow passage is more or less closed until it is completely interrupted in the position shown in FIG. 3.

In order to be able to adjust different flow resistances, the U-shaped end region 15 is provided on its outer part with a cam surface 21 which extends obliquely of a diameter plane and which is provided with four depressions 22 arranged at intervals from one another in which a pin 23 fixed to a coffee machine may engage. However, the pin may also be fixed to the container 1, as shown in FIG. 4.

Figure 4:
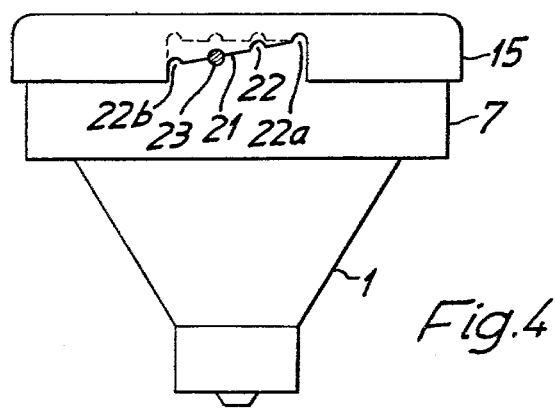
FIG. 4 is a side elevation of the filter shown in FIG. 1 with a view of the cam surface.

The size of the depression 22a shown on the right of FIG. 4 may be such that the seal 13 closes the outlet opening 5. On the other hand, the size of the depression 22 may be such that the annular projection 8 no longer projects into the annular groove 17, so that the labyrinth seal is no longer active.

The coffee filter operates as follows:

In the rest position shown in FIG. 4, the outlet opening 5 is open. If coffee powder is then poured into the filter insert 9 and boiling water poured on, the filtrate penetrates through the filter surface 10 into the intermediate space 24 between the filter surface and the container 1. Steam condenses in the region of the labyrinth seal and in the intermediate space between the tubular region 7 and the annular part 14 and forms a hermetic seal. The effect of this is that the filtration rate is increased in relation to the unsealed state. Depending on which of the depressions 22 is engaged by the pin 23, there is a more or less high resistance to flow through the flow passage formed by the grooves 18 and 20. In this way, the rate of flow of the filtrate and hence the filtration rate may be varied, for example in adaptation to the fineness of the coffee powder or to the amount of coffee powder poured in.

On completion of filtration, the pin 23 is allowed to slide into the depression 22a so that the coffee filter may be removed without any more filtrate dripping out. To enable any filtrate remaining in the coffee filter to flow out, the pin 23 is introduced into the depression 22b so that the labyrinth seal is inactive and any vacuum formed in the intermediate space 24 is eliminated.

Where the coffee filter is used in conjunction with a coffee machine, it is of advantage to form the cam surface 21 in such a way that it lies in a diameter plane of the coffee filter, as shown in chain lines in FIG. 4. In this way, when the coffee filter is removed from the coffee machine, the filter insert 9 is able to drop down until the conical seal 13 rests on the edge of the outlet opening 5 and thus closes the coffee filter. In that case, the pins 25 fixed to the coffee machine should of course be arranged in such a way that, when the coffee filter is inserted, the filter insert 9 is always slightly raised, even when the pins 25 are lying in a depression 22. This ensures that, when the coffee filter is inserted into the coffee machine, the outlet opening 5 is never closed, i.e. the boiling water cannot overflow.

Alternatively, the pin 25, instead of being fixed to the coffee machine, may even be fixed to the container of the coffee filter, although in that case there is no guarantee that the outlet opening is always open when the coffee filter is inserted into the coffee machine, i.e. the boiling water cannot overflow, and that the coffee filter does not drip on removal.

The grooves 18 and 20 do not have to extend axially parallel to the coffee filter, but instead may even be differently shaped.

The function performed by the labyrinth seal 8, 17 may even be taken over by the flat contacting surfaces of the annular part 14 on the one hand and the shoulder 6 on the other hand, providing the filter insert is designed in such a way that it only makes a rotational movement, but not an axial movement on adjustment.

The coffee filter may even be provided with a special rest position in which the outlet opening 5 is automatically closed.

I claim:

1. A permanently useable coffee filter comprising a funnel-shaped container, of which the base is provided with at least one outlet opening, and a funnel-shaped filter insert comprising filter surfaces of perforated metal foil which is inserted into the container and of which the said surfaces are situated at a distance from the wall of the container thereby establishing an intermediate space (24), characterised in that the filter insert (9) carries at its end adjacent the outlet opening (5) an end piece (11) comprising a retaining pin (12) on its side facing towards the outlet opening (5), said pin being fitted with a conical seal (13), that the filter insert (9) can be moved into several different positions relative to the container (1) and in that the end piece (11) and an adjacent region (3) of the container (1) are shaped in such a way that at least one flow passage is present between them, its flow resistance being dependent upon the position of the filter insert relative to the container.

2. A coffee filter as claimed in claim 1, characterised in that the filter insert (9) is displaceable axially of the container (1) the end piece (11) and the adjacent region (3) of the container being provided with grooves (18,20) which are shaped in such a way that, in a first position, they form a continuous flow path from the intermediate space (24) between the filter surface of the filter insert (9) and the container (1) on the one hand to the space adjoining the outlet opening and, in positions differing from this first position, constrict the flow passage.

3. A coffee filter as claimed in claim 1, characterised in that the filter insert (9) is rotatable relative to the container (1).

4. A coffee filter as claimed in claim 1, characterised in that the filter insert (9) is displaceable along a helical path relative to the container (1).

5. A coffee filter as claimed in claim 1, characterised in that an additional position is provided in which the end piece (11) closes the outlet opening (5).

6. A coffee filter as claimed in claim 5, characterised in that a seal is provided between an edge region (16) of the open side of the filter insert (9) and the container (1).

7. A coffee filter as claimed in claim 2, or 5, characterised in that the edge of the open side of the filter insert (9) is embedded in an annular part (14) and in that the annular part has a flat surface which adjoins a correspondingly shaped surface of the container (1).

8. A coffee filter as claimed in claim 6, characterised in that the edge of the open side of the filter insert (9) is embedded in an annular part (14) and in that this annular part and the adjoining region of the container are provided with a labyrinth seal (8, 17).

9. A coffee filter as claimed in claim 6, characterised in that the filter surface (10) of the filter insert (9) is separated from the wall of the container (1) by a distance of less than 1.5 mm.

10. A coffee filter as claimed in claim 6 or 7, characterised in that the annular part (14) has an edge region (15) which projects radially outwards beyond the container.

11. A coffee filter as claimed in claim 8, characterised in that the end region (15) has a U-shaped cross-section and surrounds the top end of the container.

12. A coffee filter as claimed in claim 10 or 11 for use in a coffee machine, characterised in that that region of the annular part (14) which projects radially beyond the container has at least one cam surface (21) which rests on a cam (25) fixed to the coffee machine.

13. A coffee filter as claimed in claims 3, 4, 5, 6, 7, 8, 9, 10 or 11, characterised in that the movement of the filter insert (9) relative to the container (1) is guided by a mortise-and-tenon joint.

14. A coffee filter as claimed in claim 13, characterised in that the mortise is open at one end.

* * * * *